US006901187B2

United States Patent
Haroud et al.

(10) Patent No.: US 6,901,187 B2
(45) Date of Patent: May 31, 2005

(54) FIBER LASER SENSOR

(75) Inventors: Karim Haroud, Chavannes-sur-Moudon (CH); Etienne Rochat, Essex (GB); Rene Dändliker, Corcelles (CH)

(73) Assignee: Vetco Gray Controls Limited, Bristol (GB)

( * ) Notice: Subject to any disclaimer, the term of this patent is extended or adjusted under 35 U.S.C. 154(b) by 0 days.

(21) Appl. No.: 10/257,323

(22) PCT Filed: Apr. 5, 2001

(86) PCT No.: PCT/CH01/00220

§ 371 (c)(1),
(2), (4) Date: Jan. 9, 2003

(87) PCT Pub. No.: WO01/77623

PCT Pub. Date: Oct. 18, 2001

(65) Prior Publication Data

US 2004/0071400 A1 Apr. 15, 2004

(30) Foreign Application Priority Data

Apr. 11, 2000 (DE) .......................................... 100 17 946

(51) Int. Cl.[7] .................................................. G02B 6/34
(52) U.S. Cl. .......................................... 385/37; 385/12
(58) Field of Search ....................... 385/12, 37; 372/34, 372/36, 92, 102

(56) References Cited

U.S. PATENT DOCUMENTS 5,317,576 A * 5/1994 Leonberger et al. ........... 372/6
5,671,307 A    9/1997 Lauzon et al.
5,706,079 A * 1/1998 Kersey ...................... 356/5.09
5,760,391 A * 6/1998 Narendran ............. 250/227.14
5,905,745 A    5/1999 Grubb et al.
6,058,226 A * 5/2000 Starodubov .................. 385/12

FOREIGN PATENT DOCUMENTS

| DE | 19724528 | 12/1998 |
| GB | 2323441  | 9/1998  |
| GB | 2326471  | 12/1998 |

OTHER PUBLICATIONS

Kersey et al, Fiber Grating Sensors, Aug. 1997, Journal of Lightwave Technology, vol. 15, No. 8. pp. 1442–1463.*
M.G. Xu, "Temperature–independent strain sensor using a chirped Bragg grating in a tapered optical fibre", Electronics Letters, May 11, 1995, vol. 31, No. 10.

* cited by examiner

Primary Examiner—Juliana K. Kang
(74) Attorney, Agent, or Firm—Burns, Doane, Swecker & Mathis, L.L.P.

(57) ABSTRACT

A fiber laser sensor has a fiber laser (FL) with two reflectors in the form of a first and a second Bragg grating (4, 5) and a fiber segment (3) arranged in between. The first Bragg grating (4) is arranged in a temperature-sensitive fashion. The second Bragg grating is a chirped Bragg grating (5) whose central wavelength is stabilized with regard to temperature changes. By means of this sensor, temperature and pressure can simultaneously be measured separately from one another, beat frequencies of orthogonal polarization eigenmodes of the fiber laser (FL) being a measure of the pressure and beat frequencies of longitudinal modes being a measure of the temperature.

11 Claims, 2 Drawing Sheets

FIBER LASER SENSOR

FIELD OF THE INVENTION

The invention relates to the field of optical sensor technology.

BACKGROUND OF THE INVENTION

In fiber laser sensors, changes in the refractive index of the fiber on account of external influences, such as e.g. pressure and temperature changes, are converted into a change in the laser wavelength or into a change in the beat frequency between two longitudinal laser modes.

A fiber laser sensor of this type is disclosed for example in G. A. Ball et al., "Polarimetric heterodyning Bragg-grating fiber-laser sensor", Optic Letters 18 (22), 1993, pp. 1976–1978. The sensor has a fiber laser with two Bragg gratings and a doped birefringent fiber segment that is arranged in between, acting as laser medium. The Bragg gratings are written directly into the fiber core of an optical fiber and form so-called fiber Bragg gratings. Pump light which is passed to the doped fiber segment by means of a lead fiber through one of the Bragg gratings excites two orthogonally polarized polarization eigenmodes in the fiber segment. In the emission light of the laser, the two polarization eigenmodes are brought to interference as a result of which a common beat frequency is obtained. Any external disturbance which changes the length of the laser cavity or the birefringence leads to a change in said beat frequency.

The obtained beat frequency and its changes can be measured by means of a frequency counter, so that it is possible to draw conclusions about the magnitude of the external influence, for example an external pressure or a temperature change. However, this fiber laser sensor cannot distinguish between individual external influences. In particular, temperature and pressure effects are accumulated in the sensor signal.

WO 99/44023 discloses a fiber laser pressure sensor in which two sensor fiber segments with a nonrotationally symmetrical structure are present in the laser cavity in addition to a fiber segment acting as laser medium. If an external pressure is exerted on one of these sensor fiber segments, then a pressure-proportional beat frequency is again induced between different polarization modes. In order to compensate for temperature effects, it is proposed to expose both sensor fiber segments to the temperature but only one sensor fiber segment to the external pressure. This fiber laser sensor can also be used purely for temperature measurement by determining a shift in the Bragg wavelength of the fiber Bragg grating and thus the wavelength of the emission light by means of an optical wavelength meter. The use of such an additional device increases the overall costs of the sensor. Moreover, the temperature difference between the two fiber Bragg gratings must not be greater than 10 K since otherwise the laser emission collapses on account of the different Bragg wavelengths.

WO 94/17366 describes a fiber-optic sensor with a plurality of fiber lasers connected in series. For separate measurement of the temperature, it is proposed in this case to use two fiber lasers with different wavelengths and to expose both to the same temperature and pressure changes. In this case, both fiber lasers experience the same pressure-induced, but different temperature-induced, wavelength changes. By subtracting the two signals, it is possible to determine the temperature change. Furthermore, this publication proposes configuring the two Bragg gratings of the individual fiber lasers differently, so that each fiber laser has a narrowband and a broadband Bragg grating. By using Bragg gratings of different widths, only the narrowband Bragg grating determines the Bragg wavelengths. This is intended to prevent disturbances in the cavity and thus so-called mode hopping, caused by different expansion of the two Bragg gratings.

Alan D. Kersey et al., "Fiber Grating Sensors", Journal of Lightwave Technology, Vol. 15, No. 8, 1997, pp. 1442–1463, discusses various active and passive fiber grating sensors, the use of chirped Bragg gratings for pressure and temperature measurement being disclosed.

SUMMARY OF THE INVENTION

It is an object of the invention to provide a fiber laser sensor of the type mentioned in the introduction which allows mutually independent measurements of temperature and pressure using simple means.

The fiber laser sensor according to the invention has a fiber laser with two Bragg gratings, a first Bragg grating being arranged in a temperature-sensitive fashion and the second Bragg grating being a chirped Bragg grating whose reflection zone is temperature-stabilized for its central wavelength.

What is achieved by this arrangement is that laser emission light brought to interference has two beat frequencies. One of these is proportional to a temperature change induced in the first Bragg grating and the other to a pressure change induced in the laser. In this case, in particular, the temperature-dependent change is linear. Consequently, temperature and pressure can be measured simultaneously, but independently of one another.

In a preferred embodiment, the chirped Bragg grating itself is temperature-stabilized, for example by means of a cooling or heating element.

The second Bragg grating is preferably a conventional narrowband Bragg grating with an at least approximately constant grating period.

BRIEF DESCRIPTION OF THE DRAWINGS

The subject matter of the invention is explained in more detail below using a preferred exemplary embodiment which is illustrated in the accompanying drawings, in which.

DETAILED DESCRIPTION OF THE INVENTION

Figure 1:
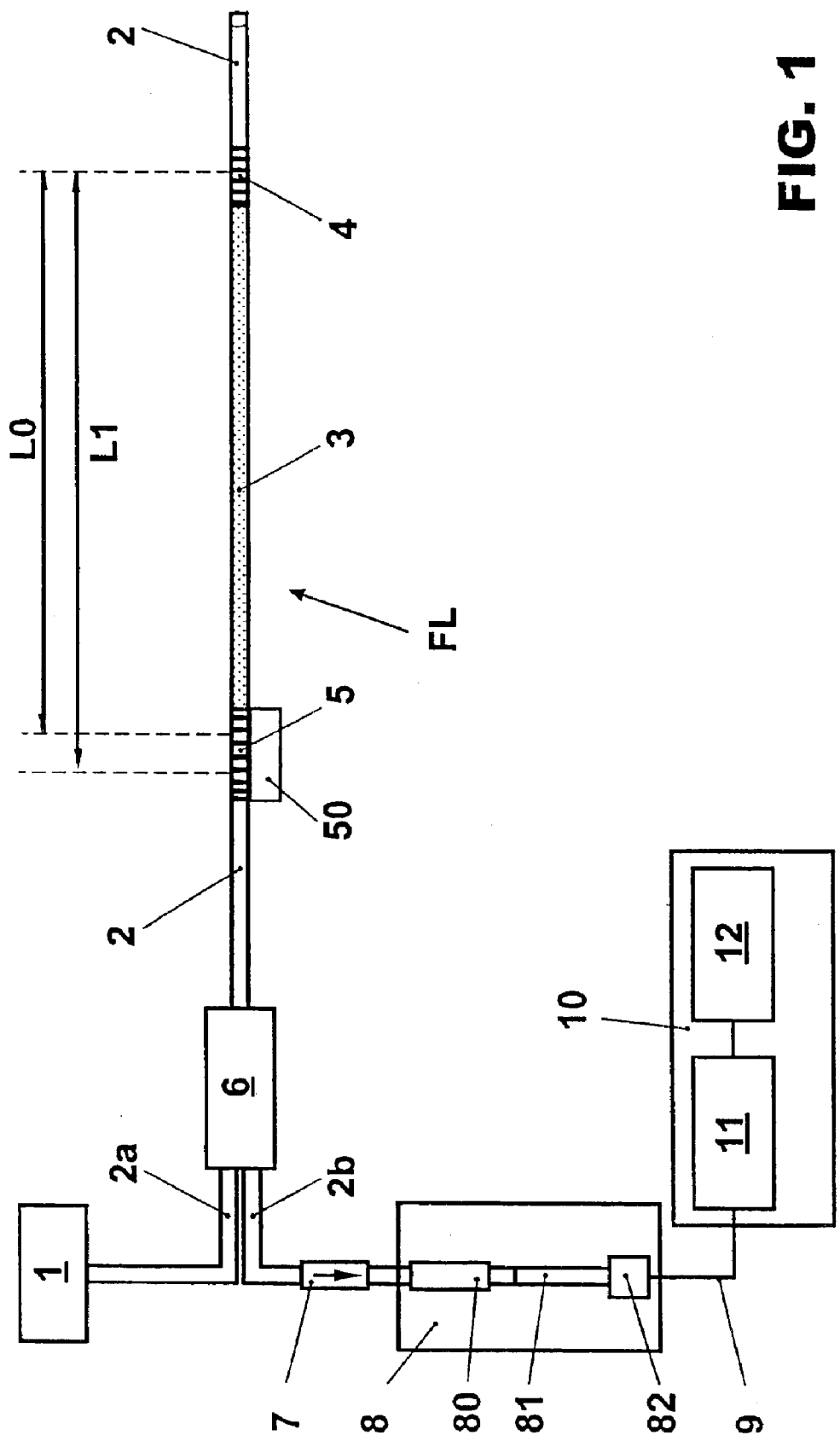
FIG. 1 shows a schematic illustration of a fiber-optic sensor according to the invention.

FIG. 1 shows a preferred exemplary embodiment of a fiber laser sensor according to the invention. The sensor essentially has a pump light source 1, an optical fiber 2 with a fiber laser FL, a detection unit 8 and an evaluation electronics 10.

The light sources that are usually used for fiber laser sensors, in particular pump lasers, can be used as pump light source 1. The pump light source 1 is optically connected via a lead fiber 2a and a fiber coupler 6 to the optical fiber 2 and the fiber laser FL.

A return fiber 2b, which leads to the detection unit 8, is likewise optically connected to the fiber coupler 6. The detection unit 8 preferably has a polarization monitor 80, an analyzer 81 and a detection means, for example a photodiode 82. The detection unit 8, more precisely the photodiode 82, is connected via a signal line 9 to the evaluation electronics 10, which, for its part, has a frequency filter 11 and a frequency counter 12. An optical isolator 7 is preferably arranged between fiber coupler 6 and detection unit 8.

A part of the optical fiber 2 is formed by the fiber laser FL. The latter consists of two end reflectors in the form of a first and a second Bragg grating 4, 5 and a fiber segment 3 arranged in between. The fiber segment 3 is formed in one or more pieces, at least one part of the segment acting as laser medium. The fibers used according to the prior art in fiber laser sensors are suitable as fiber segment 3. The fiber segment is thus intended to carry a plurality of polarization or spacial modes, preferably two, between which an external pressure change induces a differential phase shift. Birefringent, polarization-maintaining fibers, for example an Nd- or erbium-doped fiber are suitable. In this case, the birefringence can be obtained in various ways, through appropriate refractive indices in the fiber or through appropriate shaping of the fiber.

The Bragg gratings 4, 5 are fiber Bragg gratings in this exemplary embodiment. In this case, the first Bragg grating 4 is a conventional narrowband Bragg grating with an at least approximately constant grating period. Typical values of the first Bragg grating 4 are a bandwidth of 0.1 nm and a reflectivity of at least approximately 99%. According to the invention, the second Bragg grating 5 is a chirped Bragg grating, that is to say a Bragg grating with a monotonic changing grating period and/or a changing refractive index of the fiber core. Chirped Bragg gratings are known in the prior art, being employed primarily in communications technology. An overview of fiber Bragg gratings is given for example in A. Othonos "Fiber Bragg Gratings", Rev. Sci. Instrum. 68 (12) December 1997, pp. 4309–4340. Typical values of the second Bragg grating 5 are a bandwidth of 1–5 nm and a reflectivity of at least approximately 95%. Chirped Bragg gratings are distinguished in particular by the fact that they reflect a broader range of wavelengths, therefore being more broadband than the conventional Bragg gratings. In this case, the individual wavelengths reflect at locally separate reflection zones within the chirped Bragg grating. In contrast to the conventional Bragg grating the chirped Bragg grating has a linear behavior of its group delay over a relatively large spectrum.

Figure 2:
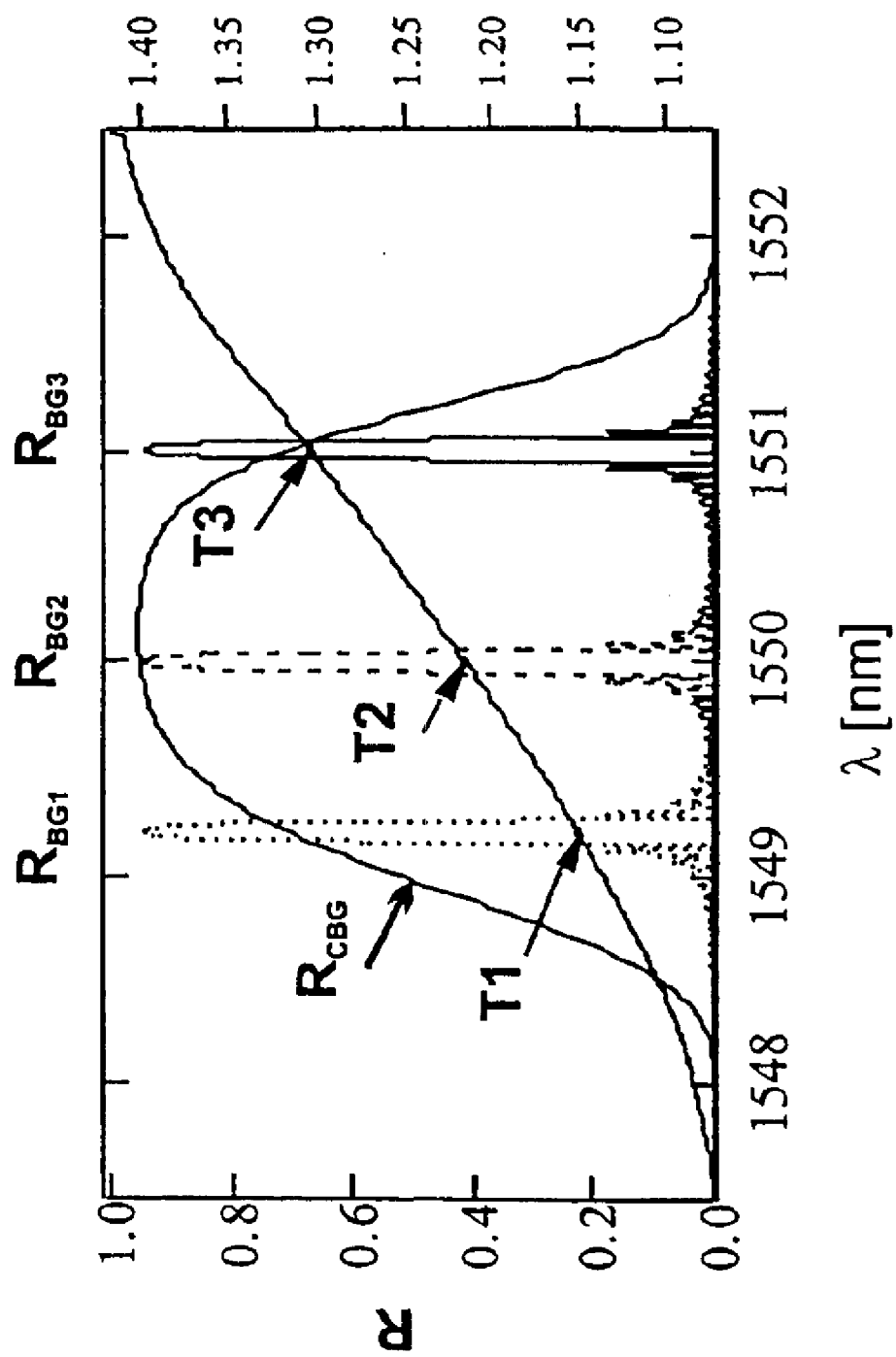
FIG. 2 shows an illustration of a reflectivity of a Bragg grating and of a chirped Bragg grating as a function of the wavelengths.

FIG. 2 illustrates the reflectivity of the chirped Bragg grating 5 and of the conventional Bragg grating 4 as a function of the wavelength (. In this case, RCBG designates the reflectivity of the chirped Bragg grating 5, RBG1 designates the reflectivity of the conventional Bragg grating 4 at a first temperature, RBG2 at a second temperature and RBG3 at a third temperature.

According to the invention, the first Bragg grating 4 is arranged in a temperature-sensitive fashion, that is to say it is exposed to external temperature influences without compensation. In the case of the chirped Bragg grating 5, by contrast, the position of the central Bragg wavelength is temperature-stabilized. Preferably, the entire chirped Bragg grating 5 is arranged in a temperature-stabilized fashion; for example, it is functionally connected to a cooling or heating element 50, in particular a Peltier element.

The chirped Bragg grating 5 is preferably arranged at the emission end of the fiber laser FL, so that laser light is coupled out via the chirped Bragg grating 5. In addition, in the embodiment illustrated here, light from the pump light source 1 is coupled into the fiber segment 3 via the chirped Bragg grating 5. However, it is also possible for the two Bragg gratings 4, 5 to be interchanged with one another.

For a pressure measurement, the fiber laser sensor according to the invention functions like the sensors disclosed in the prior art. A detailed description is therefore dispensed with here. In principle, pump light emitted by the pump light source 1 is coupled into the fiber segment 3 via a Bragg grating, in this case via the chirped Bragg grating 5. The fiber laser FL represents a laser cavity with longitudinal modes and orthogonal polarization eigenmodes coupled thereto. The eigenfrequencies of the longitudinal modes are characterized by the fact that the optical length of the fiber laser FL is filled by integer multiples of half the laser wavelength, that is to say the Bragg wavelength (B. Since the first Bragg grating 4 is of narrowband design, it determines the Bragg wavelength. The fiber segment 3 enables the oscillation build-up of at least, preferably two longitudinal modes in the cavity. The two associated orthogonal polarization eigenmodes see different reflective indices in the laser cavity on account of the birefringence. Emission light which couples out from a grating, in this case the chirped Bragg grating 5, has the Bragg wavelength (B. In the fiber coupler 6, the emission light is separated from the pump light on account of the shifted wavelength and conducted into the return fiber 2b. Back reflections into the fiber laser FL are prevented by the optical isolator 7. In the detection unit 8, the preferably two adjacent polarization modes are brought to interference by means of the analyzer 81, so that an interference signal and thus a beat frequency are obtained. In the photodiode 82 or a different detection means, the interference signal is converted into an intensity-proportional electrical signal from which, in the frequency filter 11, the desired beat signal is separated and fed to the frequency counter 12. Instead of polarization modes, spacial modes can also be used for this purpose.

If an external pressure is then induced into the fiber segment 3, there is an alteration of the birefringence in the laser cavity, which leads to a shift in the beat frequency of the polarization eigenmodes. This change can thus be determined by means of the detection unit 8 and the evaluation electronics 10 and thereby allows detection of the pressure change.

The combination according to the invention of a temperature-sensitive Bragg grating and a temperature-stabilized chirped Bragg grating now also enables a temperature measurement:

Bragg gratings react to temperature changes by a change in their grating constant and thus in their Bragg wavelength (B. The first, temperature-sensitive Bragg grating 4 thus changes its Bragg wavelength (B. On account of the change in the Bragg wavelength, there is a change in the reflection zone in the chirped Bragg grating 5, and thus in the optical length of the cavity. The length of the laser cavity is illustrated schematically in FIG. 1. In this case, L0 shall be the optical length at a temperature T0 and L1 that at a temperature T1 ( T0.

The above-mentioned condition for the oscillation build-up of the longitudinal modes has thus altered, which leads to a relative phase shift in the longitudinal modes. On account of the broadband chirped Bragg grating, however, the laser does not collapse even in the event of a severe temperature change. The shift in the reflection zone in the chirped Bragg grating 5 and thus the change in the cavity length are, because of the chirped Bragg grating, linear with regard to the wavelength change and thus to the temperature change.

The longitudinal modes, preferably two adjacent longitudinal modes, are emitted analogously to the above pressure measuring method and their beat frequency is analyzed.

They need not be brought to interference, since they already interfere with one another. In this case, the change in the beat frequency is proportional, in particular linearly proportional, to a temperature change.

Experiments were carried out with a fiber laser sensor described above, the sensor having an Nd-doped fiber segment, a chirped Bragg grating with a cosine-shaped index profile with a band spectrum of 2 nm FWHM (full width at half maximum) and a uniform chirp of −1 nm/cm, a conventional Bragg grating with a Bragg wavelength change of 0.01 nm/K and a cavity length of 5 cm at a temperature T0. In this case, the chirped Bragg grating behaved linearly within a range of the beat frequency of the longitudinal modes of 1.15–1.35 GHz and had a sensitivity of 1 MHz/0.01 nm. As a result, it is possible to detect temperature changes of up to 200 K.

Consequently, by means of the fiber laser sensor according to the invention, temperature and pressure changes can be measured simultaneously by the same fiber laser, the beat frequency of the longitudinal modes being used for temperature measurement and the beat frequency of the orthogonal polarization eigenmodes being used for pressure measurement. It is advantageous that the fiber laser sensor can be multiplexed, that is to say it is possible to arrange a plurality of fiber laser in series along a common fiber. This fiber laser sensor, in particular its fiber laser, can be configured relatively small, so that it can be used even in confined space conditions.

LIST OF REFERENCE SYMBOLS

FL Fiber laser
1 Pump light source
2a Feed fiber
2b Return fiber
2 Optical fiber
3 Fiber segment
4 First Bragg grating
5 Second Bragg grating (Chirped Bragg grating)
50 Cooling or heating element
6 Fiber coupler
7 Optical isolator
8 Detection unit
80 Polarization monitor
81 Analyzer
82 Photodiode
9 Signal line
10 Evaluation electronics
11 Frequency filter
12 Frequency counter L0 Length of the cavity at a temperature T0
L1 Length of the cavity at a temperature T1
RGBG Reflectivity of the chirped Bragg grating
RBG1 Reflectivity of the first Bragg grating at a temperature T1
RBG2 Reflectivity of the first Bragg grating at a temperature T2
RBG3 Reflectivity of the first Bragg grating at a temperature T3
( Wavelength
(B Bragg wavelength

What is claimed is:

1. A fiber laser sensor with a fiber laser, having two reflectors in the form of a first and a second Bragg grating and a fiber segment arranged in between the reflectors, wherein the first Bragg grating is temperature-sensitive and the second Bragg grating is a chirped Bragg grating, the chirped Bragg grating having a temperature-stabilized reflection zone of its central wavelength.

2. The sensor as claimed in claim 1, wherein the chirped Bragg grating itself is temperature-stabilized.

3. The sensor as claimed in claim 1, wherein it is a combined pressure and temperature sensor.

4. The sensor as claimed in claim 1, wherein the sensor comprises a detection unit for detecting beat frequencies of orthogonal polarization or spacial eigenmodes and beat frequencies of longitudinal modes of the fiber laser, the beat frequency of the polarization or spacial eigenmodes being a measure of a pressure and the beat frequency of the longitudinal modes being a measure of a temperature.

5. The sensor as claimed in claim 1, wherein the first Bragg grating is a narrowband Bragg grating with an at least approximately constant grating period.

6. The sensor as claimed in claim 1, wherein the chirped Bragg grating is arranged at the emission end of the fiber laser.

7. The sensor as claimed in claim 2, wherein a cooling or heating element is present, which temperature-stabilizes the chirped Bragg grating.

8. The sensor as claimed in claim 7, wherein the cooling or heating element is a Peltier element.

9. The sensor as claimed in claim 1, wherein the fiber segment has at least two partial segments, at least one partial segment acting as laser medium.

10. The sensor as claimed in claim 4, wherein the detection unit detects spacial modes instead of polarization modes.

11. The sensor as claimed in claim 1, wherein the sensor is arranged such that at least two longitudinal modes can oscillate in the sensor.

* * * * *